(12) United States Patent
Yao et al.

(10) Patent No.: US 11,119,919 B2
(45) Date of Patent: Sep. 14, 2021

(54) METHOD AND APPARATUS WITH IMPROVED SPEED IN DATA WRITE-IN

(71) Applicant: LENOVO (BEIJING) LIMITED, Beijing (CN)

(72) Inventors: Aili Yao, Beijing (CN); Bo Li, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 16/499,162

(22) PCT Filed: Oct. 19, 2017

(86) PCT No.: PCT/CN2017/106831
§ 371 (c)(1),
(2) Date: Sep. 27, 2019

(87) PCT Pub. No.: WO2018/176804
PCT Pub. Date: Oct. 4, 2018

(65) Prior Publication Data
US 2020/0327053 A1    Oct. 15, 2020

(30) Foreign Application Priority Data

Mar. 29, 2017 (CN) .......................... 201710196462.9

(51) Int. Cl.
*G06F 12/08* (2016.01)
*G06F 12/0802* (2016.01)
*G06F 3/06* (2006.01)

(52) U.S. Cl.
CPC ........ *G06F 12/0802* (2013.01); *G06F 3/0604* (2013.01); *G06F 3/0655* (2013.01); *G06F 3/0676* (2013.01)

(58) Field of Classification Search
None
See application file for complete search history.

(56) References Cited

U.S. PATENT DOCUMENTS 4,545,043 A * 10/1985 Anderson ............. G06F 3/0601
360/78.08
9,870,281 B1 * 1/2018 Gosla ............... G11B 20/10527
(Continued)

FOREIGN PATENT DOCUMENTS

CN         1617110 A      5/2005
CN       101727299 A      6/2010
(Continued)

OTHER PUBLICATIONS

The World Intellectual Property Organization (WIPO) International Search Report for PCT/CN2017/106831 dated Feb. 9, 2018 6 Pages (including translation).

*Primary Examiner* — Kevin Verbrugge
(74) *Attorney, Agent, or Firm* — Anova Law Group, PLLC

(57) ABSTRACT

The present disclosure provides a data write-in method and apparatus. The method includes: generating, by a first storage module, a dataset to be written into a second storage module, where first data in the dataset is sorted according to destination storage addresses of the first data; and sequentially sending, by the first storage module, the first data in the dataset to the second storage module. The embodiments of the present disclosure may increase the speed at which the first storage module writes data into the second storage module.

17 Claims, 5 Drawing Sheets

(56) References Cited

U.S. PATENT DOCUMENTS

| | | | |
|---|---|---|---|
| 2003/0212855 A1 | 11/2003 | Sakaguchi et al. | |
| 2009/0271543 A1* | 10/2009 | Brewer | G06F 3/0613 |
| | | | 710/40 |
| 2009/0324202 A1* | 12/2009 | Okubo | H04N 19/597 |
| | | | 386/244 |
| 2010/0092148 A1* | 4/2010 | Ogawa | G11B 27/11 |
| | | | 386/306 |
| 2017/0046098 A1* | 2/2017 | Yang | G06F 3/0616 |
| 2017/0123944 A1* | 5/2017 | Macko | G06F 11/1076 |

FOREIGN PATENT DOCUMENTS

| | | |
|---|---|---|
| CN | 102662459 A | 9/2012 |
| CN | 104050090 A | 9/2014 |
| CN | 105573668 A | 5/2016 |
| CN | 107168892 A | 9/2017 |

\* cited by examiner

METHOD AND APPARATUS WITH IMPROVED SPEED IN DATA WRITE-IN

CROSS-REFERENCES TO RELATED APPLICATIONS

This application is a national phase entry under 35 U.S.C. § 371 of International Application No. PCT/CN2017/106831, filed on Oct. 19, 2017, which claims the priority of Chinese Patent Application No. 201710196462.9, filed with the State Intellectual Property Office of P. R. China on Mar. 29, 2017, the entire contents of which are incorporated herein by reference.

FIELD OF THE DISCLOSURE

The present disclosure generally relates to the field of computer technology and, more particularly, relates to a data write-in method and apparatus.

BACKGROUND

With the rapid development of computer hardware performance, both capacity and access speed of computer cache devices have been substantially improved.

Currently, when a cache device reaches a cache refresh threshold, that is, a substantial amount of data has been stored in the cache device, which has no more space to take in more data, it is necessary to swap out less frequently used data from the cache device. The cache device may send the to-be-swapped-out data to a magnetic disk device to write the data onto the magnetic disk device. The magnetic disk device writes the data to respective destination storage addresses through a movable magnetic head. However, when the destination storage addresses are distant from each other, the moving range of the magnetic head is large, the writing speed of the disk device is slow, and subsequently, the speed of swapping out the data by the cache device is slow.

BRIEF SUMMARY OF THE DISCLOSURE

The primary objective of the present disclosure is to provide a data write-in method to increase the speed of swapping out the data by the cache device.

To achieve the above objective, the technical solution of the present disclosure includes the following process.

One aspect of the present disclosure provides a data write-in method. The method includes: generating, by a first storage module, a dataset to be written into a second storage module, wherein first data in the dataset is sorted according to destination storage addresses of the first data; and sequentially sending, by the first storage module, the first data in the dataset to the second storage module.

In some embodiments, the first storage module is a cache device. Generating the dataset to be written into the second storage module includes: selecting, by the first storage module, a plurality of first data from a cached dataset in the first storage module; and generating, by the first storage module, the dataset according to the plurality of first data.

In some embodiments, the dataset includes one or more data subsets. Selecting, by the first storage module, the plurality of first data from the cached dataset in the first storage module includes: selecting, by the first storage module, at least one magnetic disk zone from a magnetic disk zone set, wherein the at least one magnetic disk zone stores at least two second data; and selecting, by the first storage module, the cached data in each corresponding magnetic disk zone of the at least one magnetic zone from the cached dataset as the first data in the one or more data subsets, wherein destination storage addresses of the cached data belong to the at least one magnetic disk zone. Generating, by the first storage module, the dataset according to the plurality of first data includes: generating one or more data subsets according to an order of the selected first data in each data subset and the destination storage addresses in each corresponding magnetic disk zone; and generating the dataset according to the one or more data subsets.

In some embodiments, the at least one magnetic disk zone is magnetic disk zones having activity levels lower than a first threshold in the magnetic disk zone set.

In some embodiments, before the dataset to be written into the second storage module is generated, the method further includes: generating, by the first storage module, a magnetic disk zone queue, and sorting the magnetic disk zones in the magnetic disk zone queue according to the destination storage addresses of the magnetic disk zones, wherein each magnetic disk zone stores at least two second data; and generating, by the first storage module, the dataset according to the plurality of first data includes generating the dataset according to an order of the selected plurality of first data and the corresponding magnetic disk zone in the magnetic disk zone queue.

In some embodiments, the first data in each magnetic disk zone is sorted according to the destination storage addresses of the first data, respectively.

In some embodiments, the plurality of first data is the cached data having activity levels lower than a second threshold in the cached dataset.

In some embodiments, generating the dataset to be written into the second storage module further includes: determining whether the first storage module reaches a cache refresh condition, wherein the cache refresh condition is a condition that an amount of data in the cached dataset reaches a cache saturation threshold.

In some embodiments, before generating the dataset to be written into the second storage module, the method further includes: receiving an access request to the second storage module, including destination storage addresses of the to-be-accessed second data; determining whether the to-be-accessed second data has already been synchronized; if the to-be-accessed data has not been synchronized, determining whether the first storage module reaches a cache refresh condition; and if the first storage module reaches the cache refresh condition, generating the dataset.

In some embodiments, the method further includes: if the first storage module does not reach the cache fresh condition, synchronizing the to-be-accessed second data to the first storage module to obtain the cached data corresponding to the to-be-accessed second data, wherein the destination storage addresses of the cached data are the same as the destination storage addresses of the to-be-accessed second data; and recording the activity levels of the cached data corresponding to the to-be-accessed second data.

In some embodiments, the method further includes: if the to-be-accessed second data has already been synchronized, updating the activity levels of the cached data corresponding to the to-be-accessed second data.

Another aspect of the present disclosure provides a data write-in method. The method includes generating, by a first storage module, a dataset to be written into a second storage module, wherein destination storage addresses of first data in the dataset belong to a pre-set address range; and sending, by the first storage module, the dataset to the second storage module.

In some embodiments, the first storage module is a cache device. Generating the dataset to be written into the second storage module includes: selecting, by the first storage module, a plurality of first data from a cached dataset in the first storage module; and generating, by the first storage module, the dataset according to the plurality of first data.

In some embodiments, the dataset includes one or more data subsets. The plurality of first data includes the first data belonging to the one or more data subsets. Selecting, by the first storage module, the plurality of first data from the cached dataset in the first storage module includes: selecting, by the first storage module, at least one magnetic disk zone from a magnetic disk zone set, wherein each magnetic disk zone belongs to an address range of a pre-set length and the at least one magnetic disk zone stores at least two second data; and selecting, by the first storage module, the cached data in each corresponding magnetic disk zone of the at least one magnetic zone from the cached dataset as the first data in the one or more data subsets, wherein destination storage addresses of the cached data belong to the at least one magnetic disk zone.

In some embodiments, the at least one magnetic disk zone is magnetic disk zones having activity levels lower than a first threshold in the magnetic disk zone set.

In some embodiments, before the dataset to be written into the second storage module is generated, the method further includes: generating, by the first storage module, a magnetic disk zone queue, and sorting the magnetic disk zones in the magnetic disk zone queue according to the destination storage addresses of the magnetic disk zones, wherein each magnetic disk zone stores at least two second data; and generating, by the first storage module, the dataset according to the plurality of first data includes generating the dataset according to an order of the selected plurality of first data and the corresponding magnetic disk zone in the magnetic disk zone queue.

In some embodiments, the first data in each magnetic disk zone is sorted according to the destination storage addresses of the first data, respectively.

In some embodiments, the plurality of first data is the cached data having activity levels lower than a second threshold in the cached dataset.

In some embodiments, generating the dataset to be written into the second storage module further includes: determining whether the first storage module reaches a cache refresh threshold condition, wherein the cache refresh threshold condition is a condition that an amount of data in the cached dataset reaches a cache saturation threshold.

In some embodiments, before generating the dataset to be written into the second storage module, the method further includes: receiving an access request to the second storage module, including destination storage addresses of the to-be-accessed second data; determining whether the to-be-accessed second data has already been synchronized; if the to-be-accessed data has not been synchronized, determining whether the first storage module reaches a cache refresh condition; and if the first storage module reaches the cache refresh condition, generating the dataset.

In some embodiments, the method further includes: if the first storage module does not reach the cache fresh condition, synchronizing the to-be-accessed second data to the first storage module to obtain the cached data corresponding to the to-be-accessed second data, wherein the destination storage addresses of the cached data are the same as the destination storage addresses of the to-be-accessed second data; and recording the activity levels of the cached data corresponding to the to-be-accessed second data.

In some embodiments, the method further includes: if the to-be-accessed second data has already been synchronized, updating the activity levels of the cached data corresponding to the to-be-accessed second data.

Another aspect of the present disclosure provides a data write-in apparatus. The apparatus includes: a processing module configured to generate a dataset to be written into a second storage module, wherein first data in the dataset is sorted according to destination storage addresses of the first data; and a sending module configured to sequentially send the first data in the dataset to a second storage module.

In some embodiments, the processing module is further configured to: select a plurality of first data from a cached dataset in the first storage module; and generate the dataset according to the plurality of first data.

In some embodiments, the processing module is further configured to: select at least one magnetic disk zone from a magnetic disk zone set, wherein the at least one magnetic disk zone stores at least two second data; and select the cached data in each corresponding magnetic disk zone of the at least one magnetic zone from the cached dataset as the first data in the one or more data subsets, wherein destination storage addresses of the cached data belong to the at least one magnetic disk zone.

In some embodiments, the processing module is further configured to: generate a magnetic disk zone queue and sort the magnetic disk zones in the magnetic disk zone queue according to the destination storage addresses of the magnetic disk zones, wherein each magnetic disk zone stores at least two second data; and generate the dataset according to an order of the selected plurality of first data and the corresponding magnetic disk zone in the magnetic disk zone queue.

In some embodiments, the apparatus further includes a receiving module configured to receive an access request to the second storage module, including destination storage addresses of the to-be-accessed second data. The processing module is further configured to: determine whether the to-be-accessed second data has already been synchronized; if the to-be-accessed data has not been synchronized, determine whether the first storage module reaches a cache refresh condition; and if the first storage module reaches the cache refresh condition, generate the dataset.

In some embodiments, the processing module is further configured to: if the first storage module does not reach the cache fresh condition, synchronize the to-be-accessed second data to the first storage module to obtain the cached data corresponding to the to-be-accessed second data, wherein the destination storage addresses of the cached data are the same as the destination storage addresses of the to-be-accessed second data; and record the activity levels of the cached data corresponding to the to-be-accessed second data.

In some embodiments, the processing module is further configured to: if the to-be-accessed second data has already been synchronized, update the activity levels of the cached data corresponding to the to-be-accessed second data.

Another aspect of the present disclosure provides a data write-in apparatus. The apparatus includes: a processing module configured to generate a dataset to be written into a second storage module, wherein destination storage addresses of first data in the dataset belong to a pre-set address range; and a sending module configured to sequentially send the first data in the dataset to a second storage module.

In the data write-in method provided by the embodiments of the present disclosure, the dataset to be written into the second storage module is generated. The dataset is sorted according to the destination storage address of the first data. The first data in the dataset is sequentially sent to the second storage module. When the second storage module sequentially writes the first data, the total write path corresponding to the first data sequentially written according to the sorted destination storage addresses may be shorter than the total write path corresponding to the first data sequentially written according to other sorted results. Thus, the embodiments of the present disclosure may improve the speed at which the first storage module writes the data into the second storage module by generating the dataset that has a short write-in time.

DETAILED DESCRIPTION

To make the foregoing objectives, features and advantages of the present disclosure clearer and more understandable, the present disclosure will be further described with reference to the accompanying drawings and embodiments.

Embodiment One

Figure 1:
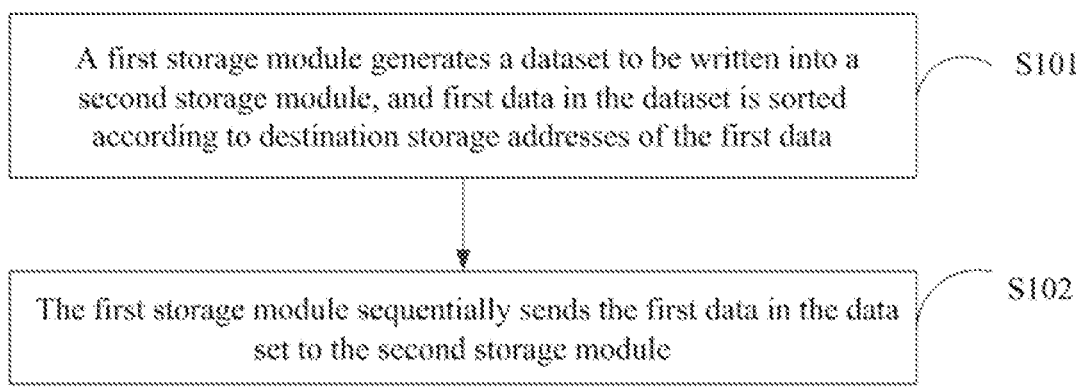
FIG. 1 illustrates a flowchart of an example of a data write-in method according to some embodiments of the present disclosure.

FIG. 1 illustrates a flowchart of an example of a data write-in method according to some embodiments of the present disclosure. As shown in FIG. 1, the data write-in method includes the following process.

S101: a first storage module generates a dataset to be written into a second storage module, and first data in the dataset is sorted according to destination storage addresses of the first data.

S102: the first storage module sequentially sends the first data in the dataset to the second storage module.

In one embodiment, the first storage module and the second storage module may include a plurality of storage units such as sectors or blocks, respectively. The size of the first data may be an integer multiple of the storage unit. The destination storage address of the first data may be a physical address of the first data in the second storage module to be written.

In one embodiment, the second storage module may be a device having a function of storing data, such as a magnetic disk device, a network server, etc. For example, the data write-in method in the embodiments of the present disclosure may be applicable to a scenario the cache device writes data to the magnetic disk device.

In one embodiment, when the first storage module is the cache device and the second storage module is the magnetic disk device, S101 may include the following process. The first storage module selects a plurality of first data from the data cached in the first storage module. The first storage module generates the dataset according to the plurality of first data.

If the destination storage addresses of the plurality of first data belong to a same second storage module or a plurality of second storage modules, the first storage module may send the first data in the dataset to the second storage module to which the destination storage addresses belong. For example, the cache device may send the dataset to a magnetic disk driver of the corresponding magnetic disk device.

In one embodiment, when the cache device reaches the cache refresh threshold condition, the step for generating the dataset to be written into the second storage module is executed. For example, the cache refresh threshold condition may be a condition that the amount of the data in the dataset cached in the cache device reaches a cache saturation threshold, that is, the cache device is almost full.

When the cache device is almost full and unable to read new data from the magnetic disk device, the cache device needs to select one or more first data from the cached data currently stored in the cache device to write into the magnetic device to vacate a part of the storage space. Thus, based on this application scenario, the data write-in method provided by the embodiments of the present disclosure can improve the speed at which the cache device performs the cache refresh operation to more quickly release the storage space in the cache device.

In one embodiment, the plurality of first data may be the cached data having an activity gauge lower than a second threshold in the cached dataset or may be a plurality of cached data having the lowest activity gauge in the cached dataset.

When a processor sends an access request to the cache device to request access to a second data in the magnetic disk device, if the second data has already been synchronized to the cache device from the magnetic disk device, that is, the dataset cached in the cache device includes the cached data corresponding to the second data, the processor may directly access the cached data corresponding to the second data in the cache device. The result of the operation is called a hit. Correspondingly, a data hit rate may be calculated according to how many access requests are the hits in a time interval. Because the first data is selected as the cached data having a low activity gauge, the method of selecting the first data to be swapped out of the cache device according to the activity gauge can improve the data hit rate of the dataset cached in the cache device, thereby increasing an average access speed of the processor.

In one embodiment, the plurality of first data in the dataset may be sorted according to the destination storage addresses from far to near or from near to far. The dataset sorted by the two methods corresponds to a same total write path length. Thus, the present disclosure does not limit the sorting methods and details are not described hereinafter.

In the data write-in method provided by the embodiments of the present disclosure, the dataset to be written into the second storage module is generated. The dataset is sorted according to the destination storage address of the first data. The first data in the dataset is sequentially sent to the second storage module. When the second storage module sequentially writes the first data, the total write path corresponding to the first data sequentially written according to the sorted destination storage addresses may be shorter than the total write path corresponding to the first data sequentially written according to other sorted results. Thus, the embodiments of the present disclosure may improve the speed at which the first storage module writes the data into the second storage module by generating the dataset that has a short write-in time.

Embodiment Two

Figure 2:
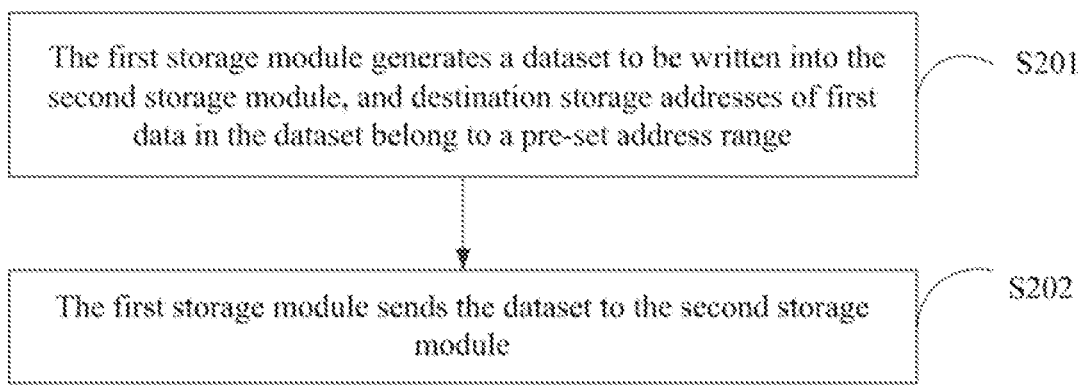
FIG. 2 illustrates a flowchart of an example of another data write-in method according to some embodiments of the present disclosure.

FIG. 2 illustrates a flowchart of an example of another data write-in method according to some embodiments of the present disclosure. The data write-in method is provided to increase the speed in which the first storage module writes the data into the second storage module by generating the dataset that has the short write-in time.

As shown in FIG. 2, the method includes the following process.

S201: the first storage module generates a dataset to be written into the second storage module, and destination storage addresses of first data in the dataset belong to a pre-set address range.

S202: the first storage module sends the dataset to the second storage module.

In one embodiment, the pre-set address range may be a consecutive storage space in the second storage module. The pre-set address range may have a pre-set length. If the dataset includes two or more first data, a distance between the destination storage address of any two first data is smaller than the pre-set length.

The destination storage addresses of the first data in the dataset generated in this way may be distributed close to each other in the second storage module. A distance to move in response to the write-in operation on the second storage module is shorter than the distance to move in response to the write-in operation on more discretely distributed data. Thus, the write-in speed of the dataset of the second storage module generated in this way is faster than the write-in speed of the more discretely distributed dataset.

In one embodiment, the first data to be written into the dataset of the second storage module may be sorted according to the destination storage addresses of the first data and each first data belongs to the pre-set address range. In this way, the technical effect of the embodiment shown in FIG. 1 may be achieved at the same time. The write-in speed of the second storage module may be increased at the same time from both aspects.

Similar to the method shown in FIG. 1, the first storage module may be the cache device and the second storage module may be the magnetic disk device. In one embodiment, when the cache device reaches the cache refresh threshold condition, the step of generating the dataset to be written into the second storage module is executed. In this application scenario, the data write-in method may also improve the speed at which the cache device performs the cache refresh operation, thereby more quickly releasing the storage space in the cache device.

In one embodiment, the address range of the pre-set length may be defined a magnetic disk zone. Each magnetic disk zone may include a plurality of storage units. Each storage unit may be a sector or a block.

As such, S201 may include the following process. The first storage module selects a magnetic disk zone from a magnetic disk zone set. Two second data are stored in the magnetic disk zone. The first storage module selects the cached data corresponding to the magnetic disk zone from the cached dataset thereof as the first data in the dataset. The destination storage addresses of the cached data belong to the magnetic disk zone. The first storage module generates the dataset according to a plurality of first data.

The second storage module may be divided into a plurality of magnetic disk zones. The magnetic disk zone set may include a plurality of magnetic zone identifiers. Using the method of selecting the magnetic disk zone may allow the first storage module to quickly select the first data in short distance to generate the dataset.

In one embodiment, the selected magnetic disk zone may be the magnetic disk zone having the activity gauge lower than a first threshold in the magnetic disk set. In another embodiment, the selected magnetic disk zone may be the magnetic disk zone having the lowest activity gauge in the magnetic disk zone set. Similar to the method shown in FIG. 1, because the cached data corresponding to the magnetic disk zone having the low activity gauge is selected as the first data, the method of selecting the first data to be swapped out of the cache device according to the activity gauge may increase the data hit rate of the cached dataset remained in the cache device, thereby increasing the average access speed of the processor.

In the data write-in method provided by the embodiments of the present disclosure, the dataset including at least one data subset is generated. The destination storage addresses of the first data in the data subset belong to the address range of the pre-set length. Because the first data in each data subset of the dataset has a relatively concentrated distribution of the write-in addresses in the second storage module, the distance to move in response to the write-in operation on the second storage module is shorter than the distance to move in response to the write-in operation on the discretely distributed data. Thus, the embodiments of the present disclosure may increase the speed at which the first storage module writes the data into the second storage module.

Figure 3:
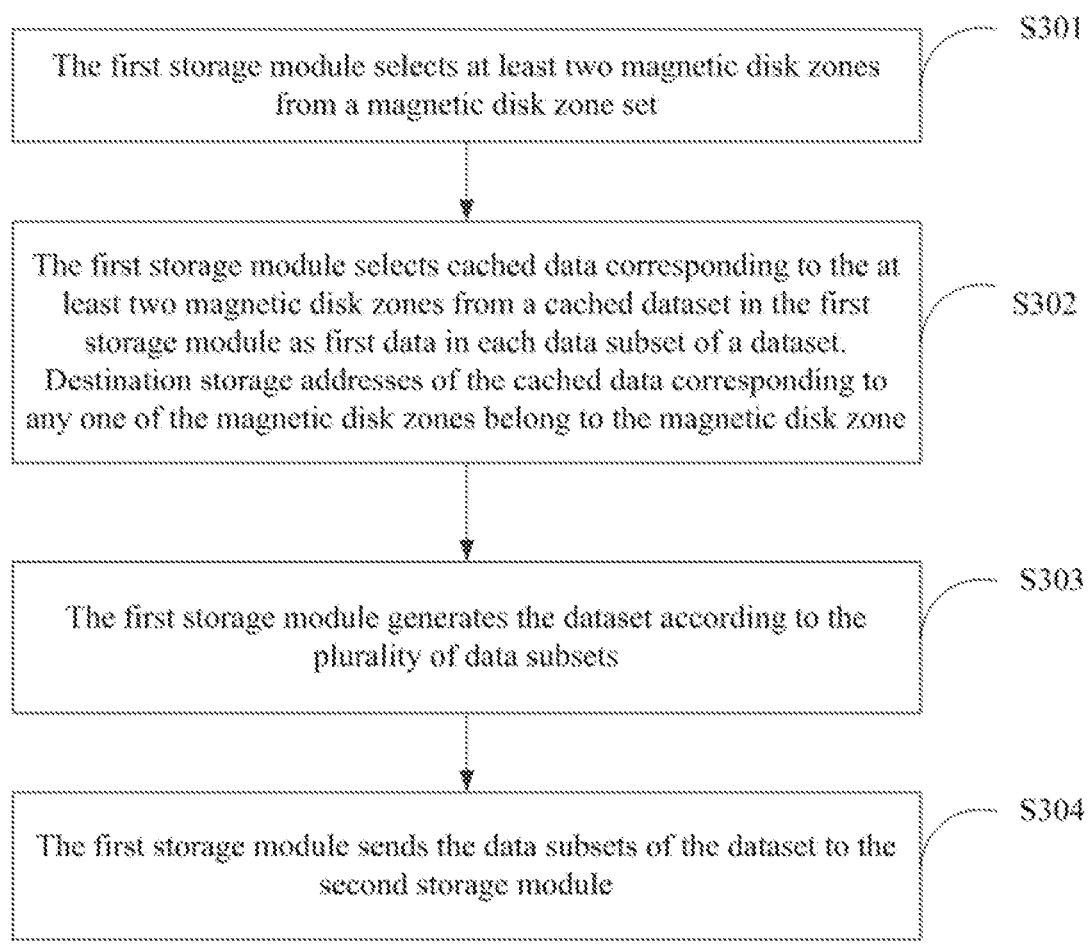
FIG. 3 illustrates a flowchart of another example of the data write-in method in FIG. 2 according to some embodiments of the present disclosure.

FIG. 3 illustrates a flowchart of another example of the data write-in method in FIG. 2 according to some embodiments of the present disclosure. In one embodiment, the dataset to be written into the second storage module in the method in FIG. 2 may include at least one data subset. The first data in the any data subset may belong to the address range of the pre-set length. That is, the first data in one data subset may belong to one address range. Different data subset may correspond to different address range.

The method in FIG. 3 is improved over the method in FIG. 2. As shown in FIG. 3, S201 corresponds to S301-S303 described below and S202 corresponds to S304.

S301: the first storage module selects at least two magnetic disk zones from a magnetic disk zone set.

At least one magnetic disk zone in the at least two magnetic disk zones stores at least two second data.

S302: the first storage module selects cached data corresponding to the at least two magnetic disk zones from a cached dataset in the first storage module as first data in each data subset of a dataset. Destination storage addresses of the cached data corresponding to any one of the magnetic disk zones belong to the magnetic disk zone.

S303: the first storage module generates the dataset according to the plurality of data subsets.

S304: the first storage module sends the data subsets of the dataset to the second storage module.

In one embodiment, because the first data in each data subset is close to each other, when the second storage module writes each first data in the dataset, the second storage module may write the first data closely distributed in each data subset respectively. As such, the speed at which the second storage module writes the dataset generated in this way is faster than the speed at which the second storage module writes the data that repeatedly crosses the address ranges.

In one embodiment, the at least one magnetic disk zone is the magnetic disk zone having the activity gauge lower than the first threshold in the magnetic disk zone set. In another embodiment, the at least one magnetic disk zone is the at least one magnetic disk zone having the lowest activity gauge in the magnetic disk zone set.

The activity gauge in each magnetic disk zone may be obtained according to the activity gauge of the cached data in the corresponding magnetic disk zone. For example, the activity levels of three cached data in the corresponding magnetic disk zone is a, b, and c, respectively. The activity gauge of the magnetic disk zone is a sum of a, b, and c. The three cached data may correspond to three sectors or blocks, such as a sector p, a sector q, and another sector.

With the rapid development of the storage technology, the storage capacity of the cache device increases substantially. For example, a non-volatile dual inline memory module (NVDIMM) in the non-volatile memory chips has the maximum capacity 256 GB. When the storage capacity of the cache device reaches a certain level, a time interval T for the cache device to reach the cache refresh threshold is relatively long. In the relatively long time interval T, the access requests to the cache device by the processor in a past time interval may concentrate in one or more magnetic disk zones of the magnetic disk device. For example, the processor accesses a computer program. A file involved in the computer program often has a nearby storage address in the magnetic disk device, such as in a same magnetic disk zone. As such, when the cache device needs to perform the cache refresh operation, the process of selecting the magnetic disk zone in the magnetic disk zone set may swap all the cached data in the corresponding magnetic disk zone out of the cache device. That is, the cached data corresponding to the computer program is swapped out of the cache device. The data hit rate of the cache device may not be reduced because the cached data in the corresponding selected magnetic disk zone includes some cached data having a relatively high activity gauge. Thus, not only the data hit rate of the cache device is maintained, but also the speed at which the cache device performs the cache refresh operation is increased.

In one embodiment, the magnetic disk zones in the magnetic disk zone set may be sorted according to the destination storage addresses thereof. The process of generating the dataset according to the plurality of data subsets in S303 may include: generating the dataset according to an order of the magnetic disk zones corresponding to the plurality of data subsets in the magnetic disk zone set, where the plurality of data subsets in the dataset is sorted according to the destination storage addresses.

Further, the first data in each data subset may be sorted according to the destination storage addresses thereof. The process of generating the dataset according to the plurality of data subsets in S303 may include: generating the dataset according to an order of the first data in a corresponding first data subset, where the plurality of data subsets in the dataset is sorted according to the destination storage addresses and the cached data in each data subset is sorted according to the destination storage addresses.

It should be noted that, in this process, the two methods as shown in FIG. 1 and FIG. 2 are practically combined. That is, the destination storage addresses of the first data in the generated to-be-written dataset belong to the pre-set address range, and the first data in the dataset is sorted according to the destination storage addresses. As such, the process may simultaneously have the technical effects that the methods shown in FIG. 1 and FIG. 2 can bring. That is, the distribution of the to-be-written first data is relatively concentrated, and detours in the write-in operations may be avoided. Thus, the total write path is made shorter, and the speed at which the second storage module writes the data is substantially increased.

Other technical details and technical effects of the embodiments are similar to the method shown in FIG. 2 and will not be described herein.

Embodiment Three

Figure 4:
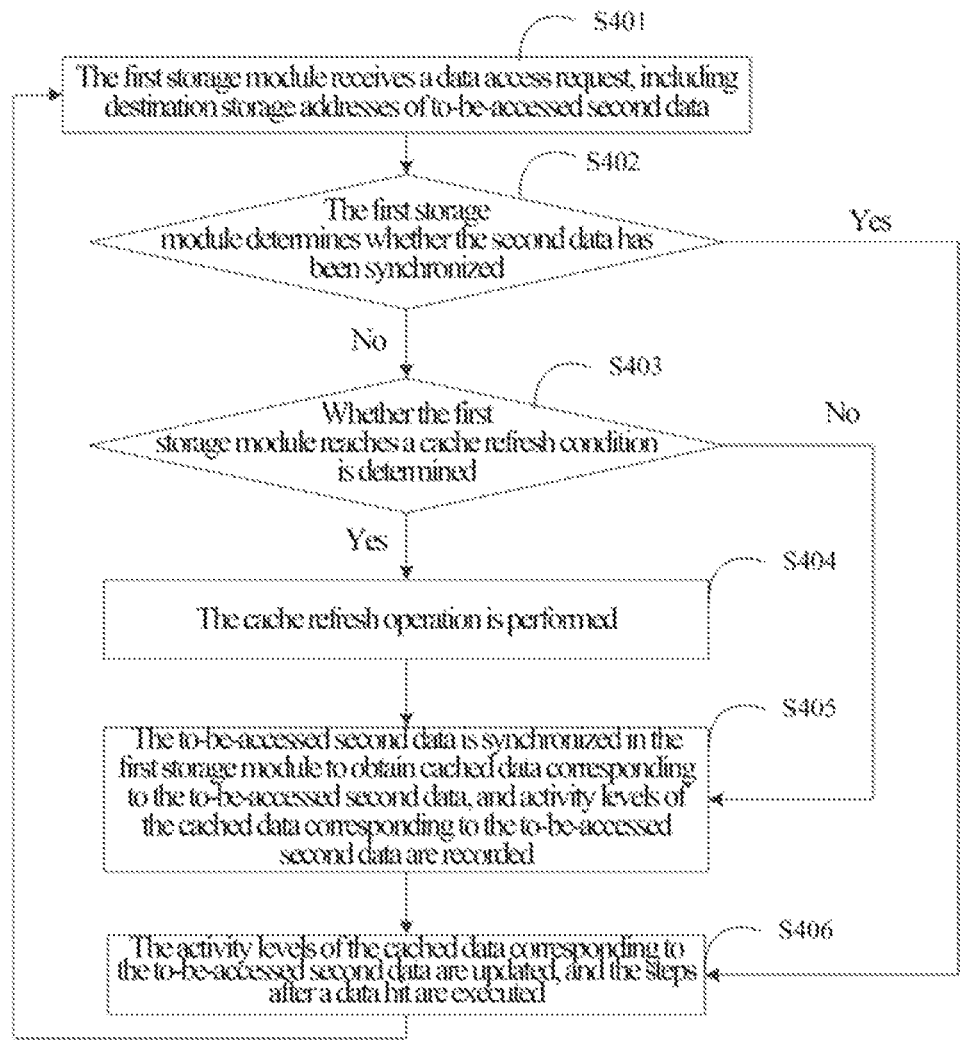
FIG. 4 illustrates a flowchart of an example of another data write-in method according to some embodiments of the present disclosure.
Figure 5:
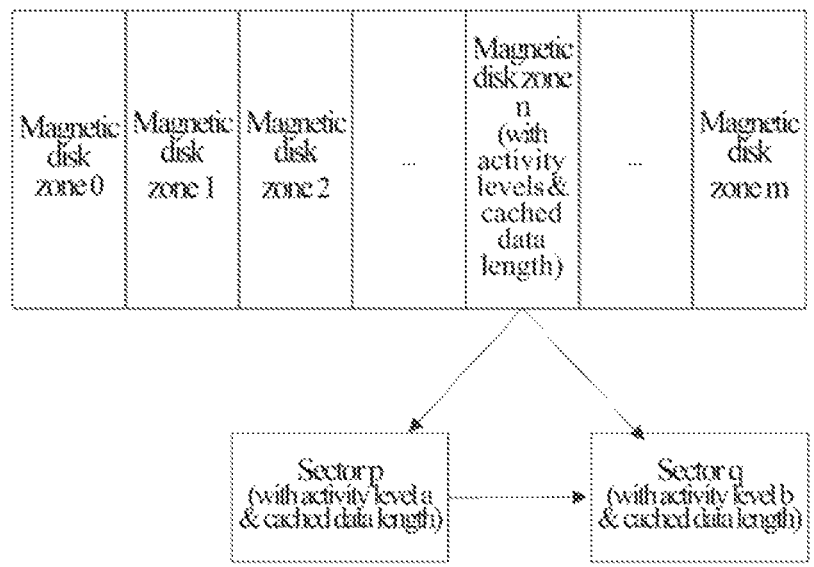
FIG. 5 illustrates a schematic diagram of a magnetic disk zone queue in an example of a data write-in method according to some embodiments of the present disclosure.

FIG. 4 illustrates a flowchart of an example of another data write-in method according to some embodiments of the present disclosure. FIG. 5 illustrates a schematic diagram of a magnetic disk zone queue in an example of a data write-in method according to some embodiments of the present disclosure. The present disclosure provides a method for performing a cache refresh operation when the cache device reaches the cache refresh threshold condition. Further, the method may be used to obtain the activity gauge of the cached data in the cached dataset in the first storage module. As such, the cached data having a low activity gauge may be selected to be written into the second storage module when performing the cache refresh operation.

As shown in FIG. 4, the method includes the following steps. Before step S101 in the method in FIG. 1 (not shown in FIG. 4) or step S201 in the method in FIG. 2 (not shown in FIG. 4) is executed, the method in FIG. 4 executes the following steps.

S401: the first storage module receives a data access request, including destination storage addresses of to-be-accessed second data.

The data access request may be sent by a processor to a first storage module.

S402: the first storage module determines whether the second data has been synchronized; if the to-be-accessed second data has not been synchronized, S403 is executed; if the to-be-accessed second data has been synchronized, S406 is executed.

S403: whether the first storage module reaches a cache refresh condition is determined; if the first storage module has reached the cache refresh condition, S404 is executed; if the first storage module has not reached the cache refresh condition, S405 is executed.

S404: the cache refresh operation is performed, and S405 is executed next.

If the steps in the method in FIG. 4 are executed before the step S101 in the method in FIG. 1 is executed, the cache refresh operation may include: generating a dataset to be written into the second storage module, and sequentially sending first data in the dataset to the second storage module. The process of generating the dataset to be written into the second storage module may adopt any of the embodiments in the method in FIG. 1.

If the steps in the method in FIG. 4 are executed before S201 in the method in FIG. 2, the cache refresh operation may include: generating the dataset to be written into the second storage module and sending the dataset to the second storage module. The process of generating the dataset to be written into the second storage module may adopt any of the embodiments in the methods in FIG. 2 and FIG. 3.

S405: the to-be-accessed second data is synchronized in the first storage module to obtain the cached data corresponding to the to-be-accessed second data, and activity levels of the cached data corresponding to the to-be-accessed second data are recorded; S406 is executed next.

The destination storage address of the cached data is the same as the destination storage address of the to-be-accessed second data.

S406: the activity levels of the cached data corresponding to the to-be-accessed second data are updated, and the steps after a data hit are executed.

In one embodiment, the value of the activity gauge may be incremented by one. In another embodiment, the activity gauge of the updated cached data may be updated according to the least recently used algorithm (LRU), the least frequently used page-replacement algorithm, or other algorithms for refreshing the cache device.

In one embodiment, before S401, the method in FIG. 4 may include the following process.

S400: a first storage module generates a magnetic disk zone queue.

The magnetic disk zone queue may record attribute information and a sequence of all magnetic disk zones in the form of a linked list or an array. The attribute information of each magnetic disk zone may include at least one of a magnetic disk zone identifier, a magnetic disk zone activity gauge, a length and a number of the cached data in the magnetic disk zone, and a cached data queue corresponding to the magnetic disk zone, as shown in FIG. 5. In one embodiment, the magnetic disk zone queue may be the magnetic disk zone set in the embodiments shown in FIG. 2.

Recording the activity gauge of the cached data corresponding to the to-be-accessed second data in S405 may include: adding an identifier of the cached data corresponding to the to-be-accessed second data into the cached data queue in the corresponding magnetic disk zone in the magnetic disk zone queue.

The cached data queue may record attribute information and a sequence of all first cached data in the form of a linked list or an array. The attribute information of each cached data may include at least one of a cached data identifier and a cached data activity gauge, as shown in FIG. 5.

In the magnetic disk zones, recording the information of the magnetic disk queue, the magnetic disk zone set, and the cached data queue in each corresponding magnetic disk zone in the linked list or the array may store the sequence information of the cached data in each corresponding magnetic disk zone and the sequence information of the magnetic disk zone by using less storage space. While achieving that the first storage module quickly writes the data into the second storage module, the overhead cost is low and the speed of querying the cached data is fast.

Other technical details and technical effects of the embodiments are similar to the methods shown in FIG. 1, FIG. 2, and FIG. 3, and will not be described herein.

Figure 6:
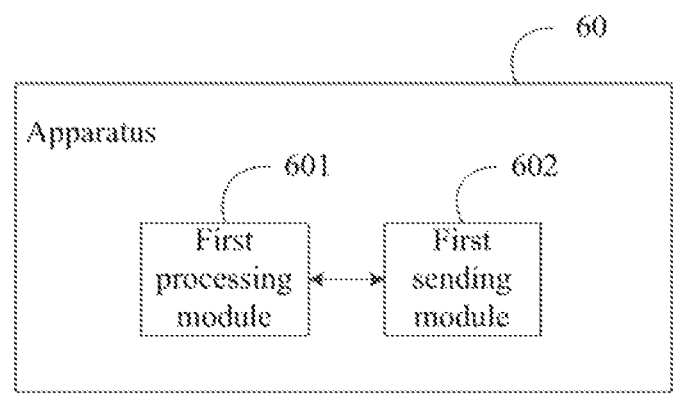
FIG. 6 illustrates a schematic diagram of an example of a data write-in apparatus according to some embodiments of the present disclosure.

FIG. 6 illustrates a schematic diagram of an example of a data write-in apparatus according to some embodiments of the present disclosure. As shown in FIG. 6, the write-in apparatus may be in the first storage module. The apparatus 60 may include a first processing module 601 configured to generate the dataset to be written into the second storage module, where the first data in the dataset is sorted according to the destination storage addresses thereof, and a first sending module 602 configured to sequentially send the first data in the dataset to the second storage module.

The first processing module 601 may be further configured to select a plurality of first data from the cached dataset thereof and to generate the dataset according to the plurality of first data.

In one embodiment, the first storage module 601 may be further configured to select at least one magnetic disk zone from the magnetic disk zone set. The magnetic disk zone stores at least two second data. the first storage module 601 may be further configured to select the cached data corresponding to the at least one magnetic disk zone from the cached dataset as the plurality of first data. The destination storage addresses of the cached data belong to the at least one magnetic disk zone.

In one embodiment, the first processing module 601 may be further configured to generate the magnetic disk zone queue. The magnetic disk zones in the magnetic disk zone queue are sorted according to the destination storage address of each magnetic disk zone. Each magnetic disk zone stores at least two second data. The first processing module 601 may be further configured to generate the dataset according to the order of the selected plurality of first data and the corresponding magnetic disk zone in the magnetic disk zone queue.

Other technical details and technical effects of the embodiments are similar to the methods shown in FIG. 1 and FIG. 4 and will not be described herein.

Figure 7:
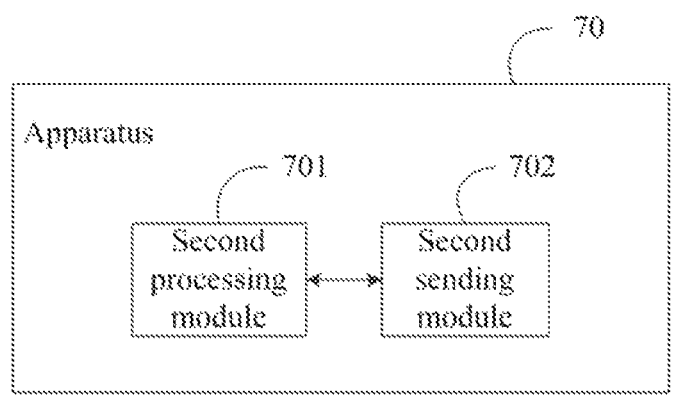
FIG. 7 illustrates a schematic diagram of another example of a data write-in apparatus according to some embodiments of the present disclosure.

FIG. 7 illustrates a schematic diagram of another example of a data write-in apparatus according to some embodiments of the present disclosure. As shown in FIG. 7, the write-in apparatus may be in the first storage module. The apparatus 70 may include a second processing module 701 configured to generate the dataset to be written into the second storage module, where the destination storage address of the first data in the dataset belongs to an address range of a pre-set length, and a second sending module 702 configured to sequentially send the dataset to the second storage module.

The second processing module 701 may be further configured to select a plurality of first data from the cached dataset thereof and to generate the dataset according to the plurality of first data.

In one embodiment, the second processing module 701 may be further configured to select at least one magnetic disk zone from the magnetic disk zone set. Each magnetic disk zone stores at least two second data. The second processing module 701 may be further configured to select the cached data corresponding to the at least one magnetic disk zone from the cached dataset as the plurality of first data. The destination storage addresses of the cached data belong to the at least one magnetic disk zone.

In one embodiment, the second processing module 701 may be further configured to generate the magnetic disk zone queue. The magnetic disk zones in the magnetic disk zone queue are sorted according to the destination storage address of each magnetic disk zone. Each magnetic disk zone stores at least two second data. The second processing module 701 may be further configured to generate the dataset according to the order of the selected plurality of first data and the corresponding magnetic disk zone in the magnetic disk zone queue.

Other technical details and technical effects of the embodiments are similar to the methods shown in FIG. 1 and FIG. 4 and will not be described herein.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

Those skilled in the art may appreciate that the embodiments of the present disclosure provide the method, the system, or the computer program product. Accordingly, the present disclosure may be implemented in hardware, software, or a combination of hardware and software. Moreover, the present disclosure may take the form of one or more computer program products included in the computer readable storage media (including, but not limited to, magnetic disk memory and optical memory) containing the computer programs.

The present disclosure has been described with reference to flowcharts and/or block diagrams of the method, the apparatus (the system), and the computer program products according to the embodiments of the present disclosure. It should be understood that the computer instructions may be used to implement each step and/or each function block of the flowcharts and/or the block diagrams and combinations of steps and/or function blocks of the flowcharts and/or the block diagrams. The computer program instructions may be provided to a processor of a general-purpose computer, a special-purpose computer, an embedded processor, or other programmable data processing devices to produce a machine for the execution of the instructions to be executed by the processor of the computers or the other programmable data processing devices for implementing the apparatus having the functions specified in one or more steps of the flowcharts and/or in one or more function blocks of the block diagrams.

The computer program instructions may also be stored in the computer readable memory to instruct the computers or the other programmable data processing devices to operate in certain ways, such that the instructions stored in the computer readable memory produce a manufacture including the instruction apparatus. The instruction apparatus implements the functions specified in one or more steps of the flowcharts and/or in one or more function blocks of the block diagrams.

The computer program instructions may also be loaded to the computers or the other programmable data processing devices to facilitate the computers or the other programmable data processing devices to execute a series of operation steps to perform the computer-implemented processing. Thus, the instructions executed by the computers or the other programmable data processing devices are configured to implement the steps of the functions specified in one or more steps of the flowcharts and/or in one or more function blocks of the block diagrams.

The embodiments of the present disclosure are described for illustrative purposes and are not intended to limit the scope of the present disclosure.

What is claimed is:

1. A method, comprising:
    selecting, by a first storage module, being a cache device, a plurality of first data from a cached dataset in the first storage module, wherein the first data in the dataset is sorted according to destination storage addresses of the first data in a second storage module;
    generating, by the first storage module, a magnetic disk zone queue, and sorting magnetic disk zones in the magnetic disk zone queue according to the destination storage addresses of the magnetic disk zones, wherein each magnetic disk zone stores at least two second data;
    generating, by the first storage module, a plurality of the first data from the cached dataset in the first storage module the dataset according to an order of the selected plurality of first data and the corresponding magnetic disk zone in the magnetic disk zone queue; and
    sequentially sending, by the first storage module, the sorted first data to the second storage module to be written into the second storage module.

2. The method according to claim 1,
    wherein the dataset includes one or more data subsets;
    wherein selecting, by the first storage module, the plurality of first data from the cached dataset in the first storage module includes:
        selecting, by the first storage module, at least one magnetic disk zone from a magnetic disk zone set, wherein the at least one magnetic disk zone is configured to store at least two second data; and
        selecting, by the first storage module, the cached data in each corresponding magnetic disk zone of the at least one magnetic zone from the cached dataset as the first data in the one or more data subsets, wherein destination storage addresses of the cached data are in the at least one magnetic disk zone, and
    wherein generating, by the first storage module, the dataset according to the plurality of first data includes:
        generating one or more data subsets according to an order of the selected first data in each data subset and the destination storage addresses in each corresponding magnetic disk zone; and
        generating the dataset according to the one or more data subsets.

3. The method according to claim 2, wherein the at least one magnetic disk zone is a magnetic disk zone having activity levels lower than a first threshold in the magnetic disk zone set.

4. The method according to claim 1,
    wherein the plurality of first data in each magnetic disk zone is sorted according to the destination storage addresses of the first data, respectively.

5. The method according to claim 4, wherein:
    the plurality of first data comprises cached data having activity levels lower than a second threshold in the cached dataset.

6. The method according to claim 1, wherein generating the dataset to be written into the second storage module further comprises:
    determining whether the first storage module meets a cache refresh condition, wherein the cache refresh condition corresponds to an amount of data in the cached dataset reaches a cache saturation threshold.

7. The method according to claim 6, wherein before generating the dataset to be written into the second storage module, the method further comprises:
    receiving an access request to the second storage module, including destination storage addresses of to-be-accessed second data;
    determining whether the to-be-accessed second data has already been synchronized;
    if the to-be-accessed data has not been synchronized, determining whether the first storage module meets a cache refresh condition; and if the first storage module meets the cache refresh condition, generating the dataset.

8. The method according to claim 7, further comprising:
if the to-be-accessed second data has already been synchronized, updating the activity levels of the cached data corresponding to the to-be-accessed second data.

9. A method, comprising:
selecting, by a first storage module, being a cache device, a plurality of first data from a cached dataset in the first storage module, wherein destination storage addresses of the first data in the second storage module are in a pre-set address range;
determining whether the first storage module meets a cache refresh condition, wherein the cache refresh condition corresponds to an amount of data in the cached dataset reaches a cache saturation threshold;
generating, by the first storage module, a plurality of the first data from the cached dataset in the first storage module the dataset according to an order of the selected plurality of first data; and
sequentially sending, by the first storage module, the dataset to the second storage module to be written into the second storage module.

10. The method according to claim 9,
wherein the dataset includes one or more data subsets,
wherein the plurality of first data includes the first data belonging to the one or more data subsets, and
wherein selecting, by the first storage module, the plurality of first data from the cached dataset in the first storage module includes:
selecting, by the first storage module, at least one magnetic disk zone from a magnetic disk zone set, wherein each magnetic disk zone is in an address range of a pre-set length and the at least one magnetic disk zone stores at least two second data; and
selecting, by the first storage module, the cached data in each corresponding magnetic disk zone of the at least one magnetic zone from the cached dataset as the first data in the one or more data subsets, wherein destination storage addresses of the cached data are in the at least one magnetic disk zone.

11. The method according to claim 10,
wherein the at least one magnetic disk zone comprises a magnetic disk zone having activity levels lower than a first threshold in the magnetic disk zone set.

12. The method according to claim 9,
wherein before the dataset to be written into the second storage module is generated, the method further comprises:
generating, by the first storage module, a magnetic disk zone queue, and sorting the magnetic disk zones in the magnetic disk zone queue according to the destination storage addresses of the magnetic disk zones, wherein each magnetic disk zone stores at least two second data; and
wherein generating, by the first storage module, the dataset according to the plurality of first data includes:
generating the dataset according to an order of the selected plurality of first data and the corresponding magnetic disk zone in the magnetic disk zone queue.

13. The method according to claim 12,
wherein the first data in each magnetic disk zone is sorted according to the destination storage addresses of the first data, respectively.

14. The method according to claim 13,
wherein the plurality of first data comprises cached data having activity levels lower than a second threshold in the cached dataset.

15. An apparatus, comprising:
a processing module configured to:
select, by a first storage module, being a cache device, a plurality of first data from a cached dataset in the first storage module, wherein the first data in the dataset is sorted according to destination storage addresses of the first data in a second storage module;
generate, by the first storage module, a magnetic disk zone queue, and sorting magnetic disk zones in the magnetic disk zone queue according to the destination storage addresses of the magnetic disk zones, wherein each magnetic disk zone stores at least two second data;
generate, by the first storage module, a plurality of the first data from the cached dataset in the first storage module the dataset according to an order of the selected plurality of first data and the corresponding magnetic disk zone in the magnetic disk zone queue; and
a sending module configured to sequentially send the sorted first data to a second storage module to be written into the second storage module.

16. The method according to claim 15, further comprising:
in response to the first storage module not meeting a cache fresh condition, synchronizing to-be-accessed second data to the first storage module to obtain the cached data corresponding to the to-be-accessed second data, wherein the destination storage addresses of the cached data are the same as the destination storage addresses of the to-be-accessed second data; and
recording the activity levels of the cached data corresponding to the to-be-accessed second data.

17. An apparatus, comprising:
a processing module configured to:
select, by a first storage module, being a cache device, a plurality of first data from a cached dataset in the first storage module wherein destination storage addresses of the first data in the second storage module are in a pre-set address range;
determine whether the first storage module meets a cache refresh condition, wherein the cache refresh condition corresponds to an amount of data in the cached dataset reaches a cache saturation threshold;
generating, by the first storage module, a plurality of the first data from the cached dataset in the first storage module the dataset according to the selected plurality of first data; and
a sending module configured to sequentially send the first data in the dataset to a second storage module to be written into the second storage module.

* * * * *